May 3, 1932.  F. H. OWENS  1,856,583
COMBINED CAMERA AND PROJECTING APPARATUS
Filed April 4, 1928  2 Sheets-Sheet 1
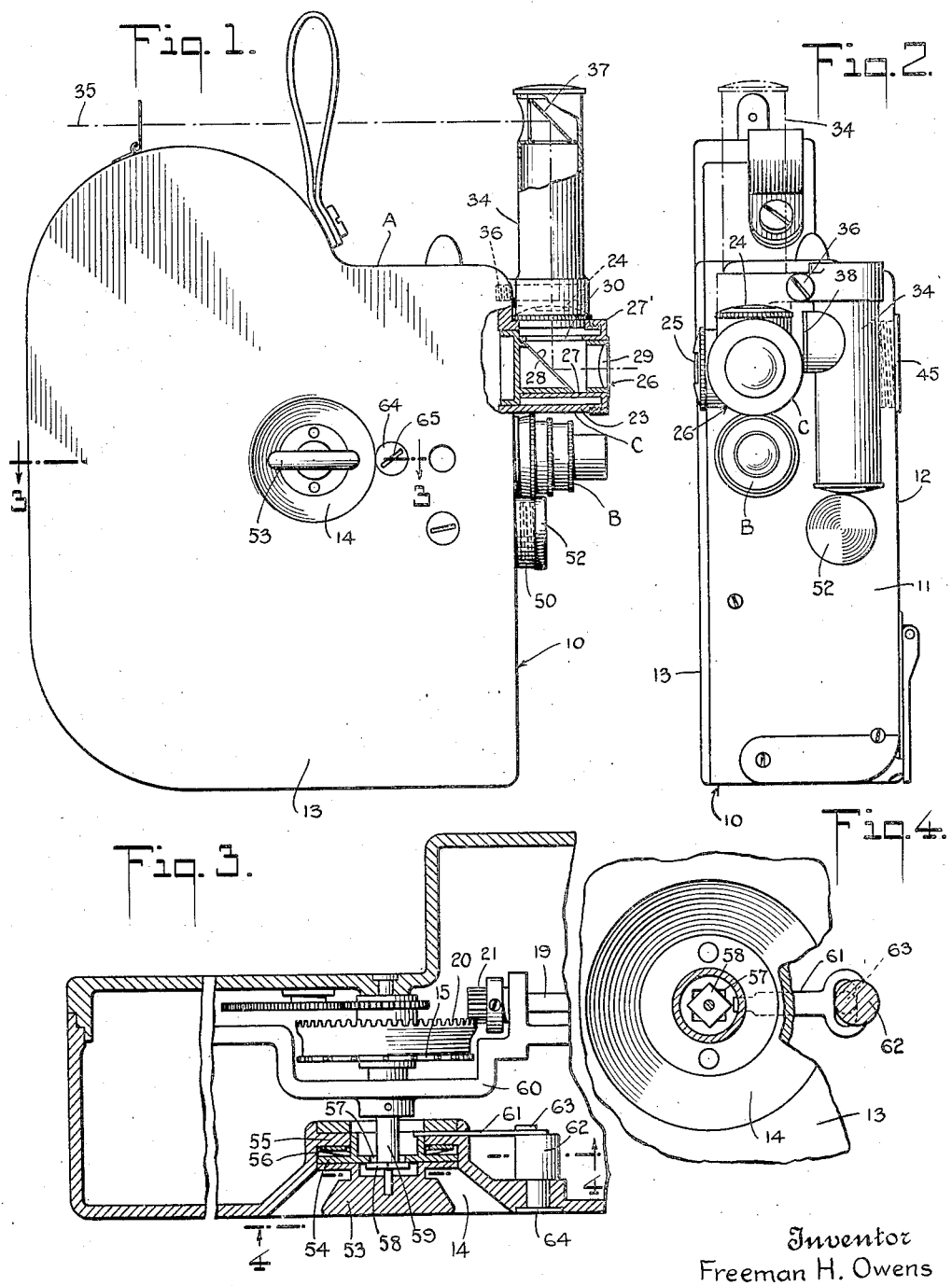
Inventor
Freeman H. Owens
By his Attorneys

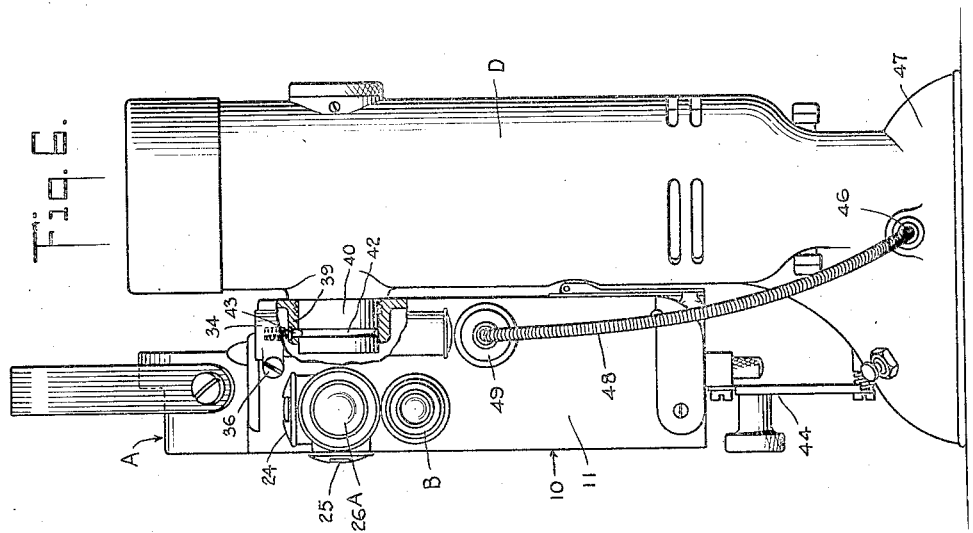
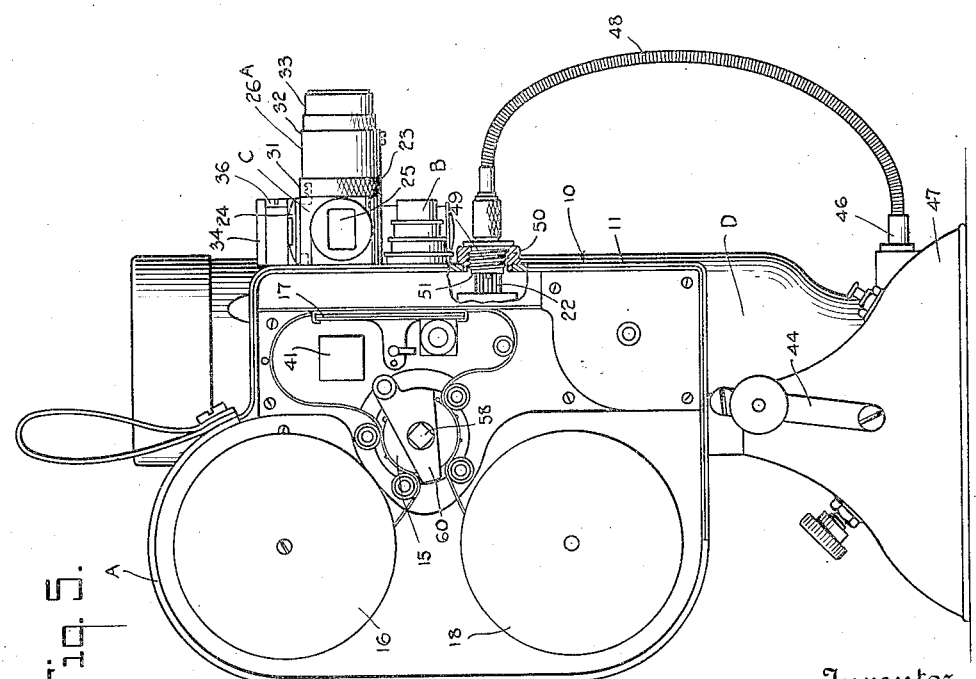

Patented May 3, 1932

1,856,583

UNITED STATES PATENT OFFICE

FREEMAN H. OWENS, OF NEW YORK, N. Y.

COMBINED CAMERA AND PROJECTING APPARATUS

Application filed April 4, 1928. Serial No. 267,158.

This invention relates to a combined camera and projecting apparatus and has special reference to the provision of an improved motion picture camera and projecting apparatus.

A prime desideratum of my present invention centers about the provision of a combined camera and projector especially designed for use with motion picture apparatus and constructed so as to be readily convertible for use either for the taking or projecting of motion pictures.

In accomplishing this prime desideratum, my invention includes the provision of a combined picture taking and projecting device embodying a camera lens system which is associated with a mount adapted for interchangeably receiving a view-finding system utilizable with the camera and a projector lens system utilizable when the apparatus is employed as a projector, the still further provision of an apparatus of this nature in which the camera, view-finding and projector lens systems are so associated with an exposure gate that a compact organization is produced; the still further provision of a combined camera and projector embodying means for detachably mounting the same to a lamp housing and for detachably connecting an external source of power thereto, all constructed and designed to permit facile association and dissociation between the parts whereby the apparatus is readily convertible into a camera or a projector; and the still further provision of an improved camera and projecting apparatus devised especially for portable use, and designed and constructed so as to be manufacturable and saleable at a comparatively low figure.

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiment of my invention, and in which Fig. 1 is a side elevational view of the combined camera and projecting apparatus of my invention shown employed in its picture taking use, Fig. 2 is a front elevational view thereof, Fig. 3 is an enlarged fragmentary view taken in cross section in the plane of the line 3—3, Fig. 1, Fig. 4 is a detailed view thereof taken in cross section in the planes of the broken line 4—4, Fig. 3, Fig. 5 is a side elevational view of the apparatus shown in its use as a projector, and Fig. 6 is a front elevational view of the latter with parts broken way to depict the detail of a mounting for the apparatus.

Referring now more in detail to the drawings and referring first to Figs. 1 and 5 thereof, my invention comprises in one of its generic aspects an apparatus generally designated as A utilizable either as a camera as shown in Fig. 1 or as a projector as shown in Fig. 5, the apparatus comprising a camera or taking lens system B and a mount C associated therewith, said mount being convertible into a view-finding lens system such as shown in Fig. 1 of the drawings when the apparatus is to be used as a camera, or into a projecting lens system such as shown in Fig. 5 of the drawings when the apparatus is to be used as a projector. When used as a projector the apparatus A is associated with as by being mounted on a combined base and lamp housing D, and when used as a camera, said apparatus A is dissociated or detached from the said combined base and lamp housing D.

Referring now further in detail to the various figures of the drawings, the apparatus A is shown to comprise a casing 10 housing the operating parts of the apparatus, said casing including a front wall 11, a side wall 12 and a removable side cover plate 13, the said cover plate 13 being adapted to be removed when the apparatus is used as a projector, as shown in Fig. 5 of the drawings, and being adapted to be locked in mounted position by a locking means generally designated as 14 when the apparatus is used as a camera and as will be described more in detail hereinafter. The operating parts of the camera projector are more specifically described and claimed in my copending application, Serial No. 267,159 dated evenly herewith, said operating mechanism being shown herein to consist of a continuous film moving sprocket 15 feeding the film from a supply reel 16 to the exposure or film gate 17 and from the same to a take-up reel 18, said sprocket being connected to drive a shutter shaft 19 by means of a crown gear 20 integral with the sprocket, meshing with a pinion 21 fixed to the shaft 19 (see Fig. 3). All of the operating mechanism is adapted to be driven from a drive gear 22 (see Fig. 5) which is adapted to be coupled to an external source of energy as will be described further hereinafter.

The camera lens system B which may be of any well known type, is mounted on the front wall 11 of the camera casing 10 in position for association with the film gate 17. The lens mount C is also associated with the film gate 17 and is located adjacent to and preferably above the camera lens system B; and the said mount C comprises a tubular element 23 having a view-finding lens 24 in a side wall thereof, preferably located at the top and also preferably provided with a second view-finding lens 25 for use when the camera is turned through an angle of 90°. The lens mount C is designed for interchangeably receiving a view-finding system generally designated as 26 or a projecting lens system generally designated as 26A.

The construction of the view-finding lens system is best shown in Figs. 1 and 2 of the drawings and by reference to these figures it will be seen that the same comprises a tubular element 27 having an outwardly flanged threaded portion 27′ received by the correspondingly threaded end of the mount 23, the said tubular element 27 having mounted therein a reflecting lens or prism 28 and a front lens element 29 associated therewith. The tubular element 27 is provided with a suitable opening 30 arranged for reflecting the view received by the lens 29 to either of the view-finding lenses 24 or 25. With this described construction it will be readily seen that the view-finding system 26 may be readily mounted on or removed from the lens mount 23 by a simple screw threaded action. When the view-finding system 26 is removed, the same is replaced by the projecting lens system 26A (see Figs. 5 and 6) which may comprise a threaded element 31 threadedly receivable by the mount 23 and provided with telescopically movable lens tubes 32 and 33 containing the usual projecting lenses relatively movable for focusing purposes.

Associated with the view-finding system 26 I prefer to provide a periscope device 34 movable so as to permit view-finding along a horizontal axis 35 above the camera casing. This periscope device 34 is preferably arranged to be pivotally movable on a pivot pin 36 fixed to the front wall 11 of the camera casing, the periscope device being movable from a vertical erect position such as shown in full lines in Fig. 1 and dotted lines in Fig. 2 to a vertical inverted position, such as shown in full lines in Figs. 2 and 6 of the drawings. In the erect position, the said periscope device 34 receives the view-finding image from the finding lens system 26 and reflects the same by means of the reflector 37 into the line of vision along the axis 35. In the inverted position the periscope device 34 is arranged to the side of the lens mount C, and it will be noted that the same occupies a non-interfering or non-obstructing position. The periscope may, if desired, embody a stop element 38 arranged to engage the mount C.

Referring now particularly to Figs. 5 and 6 of the drawings wherein the projector use of the apparatus is depicted, the apparatus is shown to comprise an opening in the side wall 12 thereof defined by a boss 39 integral with the camera casing, the same being adapted to be slipped over and supported on a tubular element 40 forming the condensing lens mount of the lamp housing D. The boss 39 and opening thereof is, as shown, in alignment with the projecting lens system 26A, a reflector 41 being interposed between the condensing lens system and the projecting lens system for shifting the direction of light projection an angle of 90°. The tubular lens mount 40 is preferably provided with an annular channel or groove 42 which receives a spring pressed plunger 43 mounted in the boss 39 for preventing lateral accidental displacement of the apparatus A when mounted on the lamp house D. This mounting also permits tilting adjustment of the projecting apparatus relatively to the lamp housing, said apparatus being adapted to be locked in any angularly adjusted position by means of the locking or clamping device generally designated as 44. This mounting and adjustment of the camera and projector A as well as the design and construction of the lamp housing D is described and claimed more specifically in my copending application, Serial No. 267,-157 filed on even date herewith.

When the combined camera and projector A is removed from the lamp housing D by manipulation of the locking means 44 and by slipping the camera casing off the condenser lens mounting 40, it is desired to close the aperture or opening of the mounting boss 39 of the camera casing and to this end I provide a light closure in the form of a cap 45 threadedly receivable by the outer threaded end of the boss 39, as will be readily seen by a comparison of Figs. 2 and 6 of the drawings.

As heretofore mentioned, the projector operating parts are adapted to be driven from the drive gear 22 which in turn is adapted to receive energy from an external source. This source of energy is in the form of a motor (not shown herein) housed by the lamp housing D, which motor is connected to a shaft 46 projecting from the base 47 of the lamp housing and connected to a flexible shaft 48 which is provided at its upper end with a coupling device 49 threadedly receivable by the threaded boss 50, the said coupling device having a clutch 51 which engages the gear 22 to drive the same. Thus, when the apparatus is used as a projector, the motor may be readily connected to drive the operating parts of the projector by screwing the coupling device 49 of the flexible shaft 48 into position as depicted in Figs. 5 and 6 of the drawings.

When the apparatus A is removed from its lamp house mounting to be used as a camera, the opening in the camera provided by the threaded boss 50 is closed by a light closure element in the form of a threaded cap 52 received by the boss 50, as clearly shown in Figs. 1 and 2 of the drawings.

When the apparatus A is used as a projector, the side wall 13 is removed and the operating parts exposed, as shown in Fig. 5 of the drawings, and when the apparatus is used as a camera, this side wall is attached in position and locked against opening by the locking means 14. This locking means comprises a knob 53 fixed to a grooved wheel 54 rotatable in a flanged hub 55 integral with the casing cover 13 and resiliently held in such wall by a spring 56, the said grooved wheel having a square opening 57 adapted to mate and interlock with a square element 58 fixed to a shaft 59 in turn fixed to some stationary part of the camera casing such as 60. When the cover 13 is mounted into position on the camera casing, the knob 53 is turned to cause the registration between the square opening 57 and the square element 58, after which the knob is partially turned to cause these parts to interlock, as shown in Figs. 3 and 4 of the drawings. When the same are thus interlocked, the parts are then locked against movement by means of a locking bolt 61 which is received by registering apertures in the wheel 54 and hub 55, said bolt being operated by being mounted on a shaft 62 eccentrically, as shown at 63, said shaft being journaled in the casing wall 13 having a part 64 which is adapted to be moved by the insertion of a coin or other appropriate element received in the groove 65 thereof (see Fig. 1).

The use and operation of my improved combined camera and projector, will, in the main, be fully apparent from the above detailed description thereof. It will also be apparent that while I have shown and described my invention in the preferred form, many changes and modifications may be made in the structure disclosed without departing from the spirit of the invention, defined in the following claims.

I claim:

1. In a combined camera and projecting apparatus, a camera lens system, a lens mount associated with said camera lens system, means for moving film past said camera lens system and said lens mount, a projecting lens system utilizable when said apparatus is used as a projector, and a view-finding lens system utilizable when said apparatus is used as a camera, said lens mount being adapted to interchangeably receive either the projecting or the view-finding lens system.

2. In a combined camera and projecting apparatus, a camera lens system mounted on the casing, a lens mount on said casing adjacent said camera lens system and adapted for interchangeably receiving, a projecting lens system when said apparatus is used as a projector, and a view-finding lens system when said apparatus is used as a camera, and means for moving film past said camera lens system and said lens mount.

3. In a combined motion picture camera and projecting apparatus, an exposure gate, means for moving film past said exposure gate, a camera lens system associated with said exposure gate, a lens mount arranged adjacent said camera lens system and also associated with said exposure gate and adapted for interchangeably receiving projecting and view-finding lens systems, a projecting lens system fitting in said mount and utilizable when the apparatus is used as a projector, and a view-finding lens system fitting in said mount and utilizable when the apparatus is used as a camera.

4. In a combined motion picture camera and projecting apparatus, an exposure gate, means for moving film past said exposure gate, a camera lens system associated with said exposure gate, a lens mount arranged above said camera lens system and also associated with said exposure gate and adapted for interchangeably receiving projecting and view-finding lens systems, said lens mount embodying a lens in a side wall thereof, a projecting lens system fitting in said mount and utilizable when the apparatus is used as a projector and a view-finding lens system fitting in said mount utilizable when the apparatus is used as a camera, said view-finding lens system embodying a front lens and a reflector in the rear thereof for reflecting the desired image into the lens in the side wall of the lens mount.

5. In a combined camera and projecting apparatus, a casing, a camera lens system mounted on said casing, a lens mount arranged adjacent said camera lens system and also mounted on said casing, means for moving film past said camera lens system and said lens mount, a projecting lens system detachably receivable by said lens mount, a view-finding lens system also detachably receivable by said lens mount and exchangeable for said projecting lens system, means on said casing adapted to be attached to an illumination system when the apparatus is used as a projector, and a light closure for said means when the apparatus is used as a camera.

6. In a combined camera and projecting apparatus, a casing, a camera lens system mounted on said casing, a lens mount arranged adjacent said camera lens system and also mounted on said casing, means for moving film past said camera lens system and said lens mount, a projecting lens system detachably receivable by said lens mount, a view-finding lens system also detachably receivable by said lens mount and exchangeable for said projecting lens system, an entrant opening in said casing adapted to receive light from a lamp housing for illuminating said mount when the apparatus is used as a projector, and a light closure for said opening when the apparatus is used as a camera.

7. In a combined camera and projecting apparatus, a casing, a camera lens system mounted on said casing, a lens mount arranged adjacent to said camera lens system and also mounted on said casing, film moving mechanism in said casing, a projecting lens system detachably receivable by said lens mount, a view-finding lens system also detachably receivable by said lens mount and exchangeable for said projecting lens system, an aperture in said casing adapted to receive light from a lamp housing when using the apparatus as a projector, a light closure for said aperture when using the apparatus as a camera, means on said casing adapted to receive a driving element for externally driving said film moving mechanism when using the apparatus as a projector and a light closure for said means when using the apparatus as a camera.

8. In a combined camera and projecting apparatus, a casing, a camera lens system mounted on said casing, a lens mount arranged adjacent to said camera lens system and also mounted on said casing, film moving mechanism in said casing, a projecting lens system detachably receivable by said lens mount, a view-finding lens system also detachably receivable by said lens mount and exchangeable for said projecting lens system, an aperture in said casing adapted to receive light from a lamp housing for illuminating said mount when using the apparatus as a projector, a cap acting as a light closure for said aperture when using the apparatus as a camera, a second aperture in said casing adapted to receive a driving element for externally driving said film moving mechanism when using the apparatus as a projector and a second cap acting as a light closure for said second aperture when using the apparatus as a camera.

9. In a combined camera and projecting apparatus, a casing, a camera lens system mounted on said casing, film moving mechanism in said casing, a projecting lens system associated therewith, an opening in said casing adapted to receive light from a light source when using the apparatus as a projector, a light closure for said opening when using the apparatus as a camera, a second opening in said casing adapted to receive a removable driving element for externally driving said film moving mechanism when using the apparatus as a projector, and a light closure for said second opening when using the apparatus as a camera.

10. In a combined camera and projecting apparatus, a casing, film moving mechanism in said casing, camera and projecting lens systems mounted in the front wall of said casing, an aperture in a wall of the casing adapted to receive light from a light source, a closure for said aperture when using the apparatus as a camera, a removable cover plate defining a side wall of the casing when used as a camera, an opening in said casing adapted to receive a removable external driving element, for externally driving said film moving mechanism when using the apparatus as a projector and a light closure for closing said opening when said element is removed for using the apparatus as a camera.

11. In a combined camera and projecting apparatus, a casing, film moving mechanism in said casing, camera and projecting lens systems mounted in the front wall of said casing, an aperture in a side wall of the casing adapted to receive light from a light source, a closure for said aperture when using the apparatus as a camera, a removable cover plate defining another side wall of the casing when used as a camera, an opening in the front wall of said casing adapted to receive a removable external driving element for externally driving said film moving mechanism when using the apparatus as a projector, and a light closure for closing said opening when said element is removed for using the apparatus as a camera.

12. In a combined camera and projecting apparatus, a camera lens system, a lens mount associated with said camera lens system and adapted for interchangeably receiving projecting and view-finding lens systems, means for moving film past said camera lens system and said lens mount, a projecting lens system fitting in said mount and utilizable when said apparatus is used as a projector, a view-finding lens system fitting in said mount and utilizable when said apparatus is used as a camera, and a periscope device for receiving the image in said view finding lens system.

13. In a combined camera and projecting apparatus, a casing, a camera lens system, a mount associated with said camera lens system and adapted for interchangeably receiving projecting lens and view-finding systems, means for moving film past said camera lens system and said lens mount, a projecting lens system fitting in said mount and utilizable when said apparatus is used as a projector, and a view-finding system fitting in said mount and utilizable when said apparatus is used as a camera, and a periscope device mounted on said casing and movable into proper relation to said mount for receiving the image in said view finding lens system.

14. In a combined camera and projecting apparatus, a casing, a camera lens system on said casing, a mount on said casing adjacent said camera lens system and adapted for interchangeably receiving projecting lens and view-finding systems, means for moving film past said camera lens system and said lens mount, a projecting lens system fitting in said mount and utilizable when said apparatus is used as a projector, a view-finding system fitting in said mount and utilizable when said apparatus is used as a camera, and a periscope device for receiving the image in said view-finding system pivotally mounted on said casing and movable from an erect vertical position above said mount to an inverted vertical position to the side of said mount.

Signed at Rome, Italy, this twentieth day of March, A. D. 1928.

FREEMAN H. OWENS.